(12) United States Patent
Zuo et al.

(10) Patent No.: US 12,474,822 B2
(45) Date of Patent: Nov. 18, 2025

(54) VIDEO PLAYBACK PROGRESS CONTROL METHOD AND DEVICE, AND STORAGE MEDIUM

(71) Applicant: Beijing Zitiao Network Technology Co., Ltd., Beijing (CN)

(72) Inventors: Dongdong Zuo, Beijing (CN); Yi Yang, Beijing (CN)

(73) Assignee: BEIJING ZITIAO NETWORK TECNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/759,727

(22) Filed: Jun. 28, 2024

(65) Prior Publication Data
US 2024/0353984 A1    Oct. 24, 2024

Related U.S. Application Data

(63) Continuation of application No. PCT/CN2023/113267, filed on Aug. 16, 2023.

(30) Foreign Application Priority Data

Aug. 30, 2022   (CN) .......................... 202211057077.3

(51) Int. Cl.
*G06F 3/0484* (2022.01)
*G11B 27/00* (2006.01)

(52) U.S. Cl.
CPC .......... *G06F 3/0484* (2013.01); *G11B 27/005* (2013.01)

(58) Field of Classification Search
CPC ............................ G06F 3/0484; G11B 27/005
(Continued)

(56) References Cited

U.S. PATENT DOCUMENTS

| 8,955,021 | B1* | 2/2015 | Treder ............. H04N 21/47217 |
| | | | 386/239 |
| 2011/0242002 | A1* | 10/2011 | Kaplan ............... G06F 3/04883 |
| | | | 345/173 |

(Continued)

FOREIGN PATENT DOCUMENTS

| CN | 105592363 A | 5/2016 |
| CN | 107592568 A | 1/2018 |

(Continued)

OTHER PUBLICATIONS

"Design of Spectrum Processing Display System Based on Android", Feb. 25, 2018, 10 pages, with English Abstract.

(Continued)

*Primary Examiner* — Cao H Nguyen
(74) *Attorney, Agent, or Firm* — Astute IP Law Group

(57) ABSTRACT

The present disclosure provides a video playback progress control method, apparatus, and device, and a storage medium. The method includes: entering a pure video playback mode in response to a touch-and-hold operation acting in a preset playback control region on a video playback page of a first video; and continuing to play the first video at a preset fast-forward speed on the video playback page in the pure video playback mode, where the preset playback control region is determined based on a display position of a playback control progress bar, and the pure video playback mode is used to hide a function control displayed on the video playback page.

13 Claims, 7 Drawing Sheets

Enter a pure video playback mode in response to a touch-and-hold operation acting in a preset playback control region on a video playback page of a first video — S101

Continue to play the first video at a preset fast-forward speed on the video playback page in the pure video playback mode — S102

(58) Field of Classification Search
USPC .......................................................... 715/720
See application file for complete search history.

(56) References Cited

U.S. PATENT DOCUMENTS

| | | | | |
|---|---|---|---|---|
| 2013/0219340 | A1* | 8/2013 | Linge ................. | G06F 3/04883 715/834 |
| 2015/0205511 | A1 | 7/2015 | Vinna et al. | |
| 2016/0198239 | A1* | 7/2016 | Shenkler ............ | G06Q 30/0269 725/32 |
| 2017/0185240 | A1 | 6/2017 | Delrosario et al. | |
| 2021/0312118 | A1* | 10/2021 | McClendon, Jr. ...... | G11B 27/11 |
| 2023/0103596 | A1* | 4/2023 | Chundi .................. | G06F 9/451 715/716 |

FOREIGN PATENT DOCUMENTS

| | | |
|---|---|---|
| CN | 109089145 A | 12/2018 |
| CN | 110519619 A | 11/2019 |
| CN | 111294637 A | 6/2020 |
| CN | 111698547 A | 9/2020 |
| CN | 113110783 A | 7/2021 |
| CN | 110519619 B | 3/2022 |
| CN | 114374868 A | 4/2022 |
| CN | 114786063 A | 7/2022 |
| CN | 115426532 A | 12/2022 |
| CN | 115426532 B | 1/2024 |
| WO | 2022/068865 A1 | 4/2022 |

OTHER PUBLICATIONS

"How to adjust the fast forward speed of Xiaomi Video", a short video on quark knowledge, Available on internet at: https://v.youku.com/v_show/id_XNDYwNzlwNDIwMA 17th to 21st seconds, Mar. 27, 2020, 5 pages.
A high school student who loves playing with a bullet house "Which video software has a long press screen video acceleration function?", Available on internet at: https://www.bilibili.com/video/BV1Ui4y117dw, Feb. 20, 2022, 2 pages.
International Search Report and Written Opinion for PCT/CN2023/113267, mailed Nov. 19, 2023, 13 pages.
Lovely514. "Shocked, Bilibili has launched a long press fast forward function", Available on internet at: https://www.bilibili.com/video/BV1bK4y1G7Xd, May 21, 2021, 3 pages.
Notice of Allowance for Chinese Patent Application No. 202211057077.3, mailed Jan. 6, 2024, 6 pages.
Office Action for Chinese Patent Application No. 202211057077.3, mailed Jul. 8, 2023, 10 pages.
Extended European Search Report for European Patent Application No. 23859157.2, mailed Mar. 6, 2025, 10 pages.

* cited by examiner

VIDEO PLAYBACK PROGRESS CONTROL METHOD AND DEVICE, AND STORAGE MEDIUM

CROSS-REFERENCE TO RELATED APPLICATIONS

The present application is a continuation of claims priority of International Patent Application No. PCT/CN2023/113267, filed on Aug. 16, 2023, which claims priority of the Chinese Patent Application No. 202211057077.3, filed on Aug. 30, 2022, the entire contents of the above application are incorporated into this application by reference.

TECHNICAL FIELD

The present disclosure relates to a video playback progress control method, apparatus, and device, and a storage medium.

BACKGROUND

With the continuous development of video processing technologies, people have increasingly diverse requirements for related functions in a video playback process.

Therefore, how to enrich interactive functions in the video playback process to improve video watching experience of users is a technical problem that needs to be solved urgently at present.

SUMMARY

To solve the above technical problem, the present disclosure provides a video playback progress control method, apparatus, and device, and a storage medium, to enrich interactive functions in a video playback process and improve video watching experience of users.

According to a first aspect, the present disclosure provides a video playback progress control method. The method includes:
  entering a pure video playback mode in response to a touch-and-hold operation acting in a preset playback control region on a video playback page of a first video, where the preset playback control region is determined based on a display position of a playback control progress bar, and the pure video playback mode is used to hide a function control displayed on the video playback page; and
  continuing to play the first video at a preset fast-forward speed on the video playback page in the pure video playback mode.

In an optional implementation, the method further includes:
  exiting the pure video playback mode in response to a lift operation corresponding to the touch-and-hold operation; and
  continuing to play the first video at a preset default speed on the video playback page.

In an optional implementation, a playback speed control is displayed in the preset playback control region. The method further includes:
  switching a current playback speed to a target playback speed in response to a preset trigger operation on the playback speed control; and
  continuing to play the first video at the target playback speed on the video playback page.

In an optional implementation, a first function control is displayed in the preset
  playback control region. A function trigger operation on the first function control includes a touch-and-hold operation. The method further includes:
  triggering a function corresponding to the first function control in response to the touch-and-hold operation acting on the first function control in the preset playback control region.

Correspondingly, the entering a pure video playback mode in response to a touch-and-hold operation acting in a preset playback control region on a video playback page of a first video includes:
  entering the pure video playback mode in response to the touch-and-hold operation acting on a specific region in the preset playback control region on the video playback page of the first video, where the specific region includes a region other than a display region of the first function control in the preset playback control region.

In an optional implementation, the method further includes:
  displaying fast-forward playback prompt information on the video playback page based on the pure video playback mode.

In an optional implementation, the preset playback control region is located at a bottom position of the video playback page.

According to a second aspect, the present disclosure provides a video playback progress control apparatus. The apparatus includes:
  a first playback module configured to enter a pure video playback mode in response to a touch-and-hold operation acting in a preset playback control region on a video playback page of a first video, where the preset playback control region is determined based on a display position of a playback control progress bar, and the pure video playback mode is used to hide a function control displayed on the video playback page; and
  a second playback module configured to continue to play the first video at a preset fast-forward speed on the video playback page in the pure video playback mode.

According to a third aspect, the present disclosure provides a computer-readable storage medium having instructions stored therein. The instructions, when run on a computer device, cause the computer device to implement the method described above.

According to a fourth aspect, the present disclosure provides a video playback progress control device. The device includes: a memory, a processor, and a computer program stored on the memory and runnable on the processor. The computer program, when executed by the processor, causes the method described above to be implemented.

According to a fifth aspect, the present disclosure provides a computer program product. The computer program product includes a computer program or instructions. The computer program or instructions, when executed by the processor, cause the method described above to be implemented.

BRIEF DESCRIPTION OF DRAWINGS

The accompanying drawings herein, which are incorporated into and form a part of the description, illustrate the embodiments in line with the present disclosure and are used in conjunction with the description to explain the principles of the present disclosure.

To describe the embodiments of the present disclosure more clearly, the accompanying drawings used for the embodiments will be briefly described below. Apparently, a person of ordinary skill in the art may still derive other drawings from these accompanying drawings without creative efforts.

DETAILED DESCRIPTION

For a clearer understanding of the above objectives, features, and advantages of the present disclosure, the solutions of the present disclosure will be further described below. It should be noted that the embodiments of the present disclosure and features in the embodiments may be combined with each other without conflict.

Many specific details are set forth in the following description to facilitate a full understanding of the present disclosure. However, the present disclosure may also be implemented in other ways different from those described herein. Apparently, the embodiments in the description are only some rather than all of the embodiments of the present disclosure.

At present, video applications have increasingly rich interaction modes in a video playback process, and video watching users also pay more attention to experience and feeling when watching videos. Therefore, how to implement diverse video playback progress control functions in the video playback process and provide the users with better watching experience has become one of the concerns among people.

To this end, an embodiment of the present disclosure provides a video playback progress control method. An entry into a pure video playback mode is triggered when a touch-and-hold operation acting in a preset playback control region on a video playback page of a first video is received. Then, the first video continues to be played at a preset fast-forward speed on the video playback page in the pure video playback mode. The preset playback control region is determined based on a display position of a playback control progress bar. The pure video playback mode is used to hide a function control displayed on the video playback page. It can be learned that according to this embodiment of the present disclosure, a video fast-forward playback function based on the pure video playback mode can be triggered through the touch-and-hold operation acting in the preset playback control region on the video playback page, so that interactive functions in a video playback process are enriched, and video watching experience of users is improved.

Figure 1:
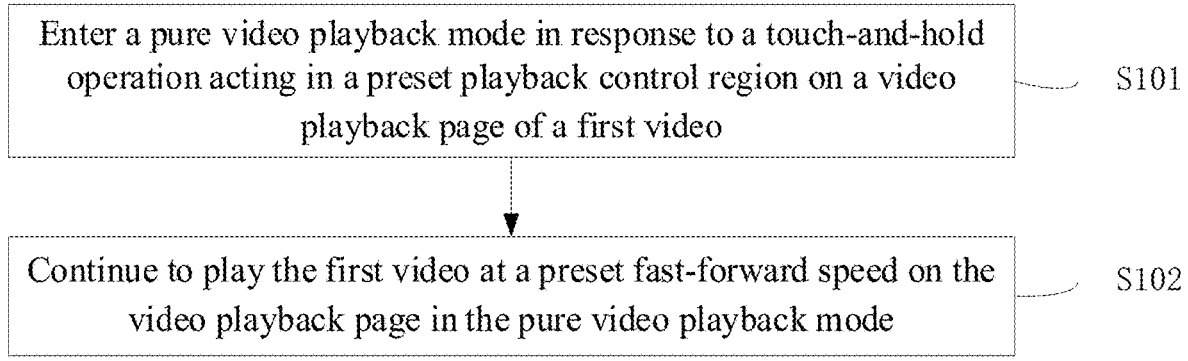
FIG. 1 is a flowchart of a video playback progress control method according to an embodiment of the present disclosure.

Based on this, an embodiment of the present disclosure provides a video playback progress control method. FIG. 1 is a flowchart of a video playback progress control method according to an embodiment of the present disclosure. The method includes the following steps.

S101: Enter a pure video playback mode in response to a touch-and-hold operation acting in a preset playback control region on a video playback page of a first video.

The preset playback control region is determined based on a display position of a playback control progress bar. The pure video playback mode is used to hide a function control displayed on the video playback page.

In this embodiment of the present disclosure, the preset playback control region is set on the video playback page. An entry into the pure video playback mode is triggered when the touch-and-hold operation acting in the preset playback control region is received. Specifically, the pure video playback mode of the first video may be entered by touching and holding any position in the preset playback control region on the video playback page of the first video.

In this embodiment of the present disclosure, the preset playback control region is determined based on the display position of the playback control progress bar on the video playback page. The playback control progress bar is used to display a playback progress of a video currently played on the video playback page, and the playback progress of the video currently played may be controlled based on the playback control progress bar.

In an optional implementation, the display position of the playback control progress bar on the video playback page may be set in a bottom region of the video playback page. Therefore, the preset playback control region determined based on the display position of the playback control progress bar may be located at a bottom position of the video playback page.

If the playback control progress bar is displayed on the video playback page, the playback control progress bar may be displayed in the preset playback control region on the video playback page. If the playback control progress bar is not displayed on the video playback page, the display position of the playback control progress bar is located in the bottom region of the video playback page by default, and the preset playback control region is set at the bottom position of the video playback page.

Figure 2:
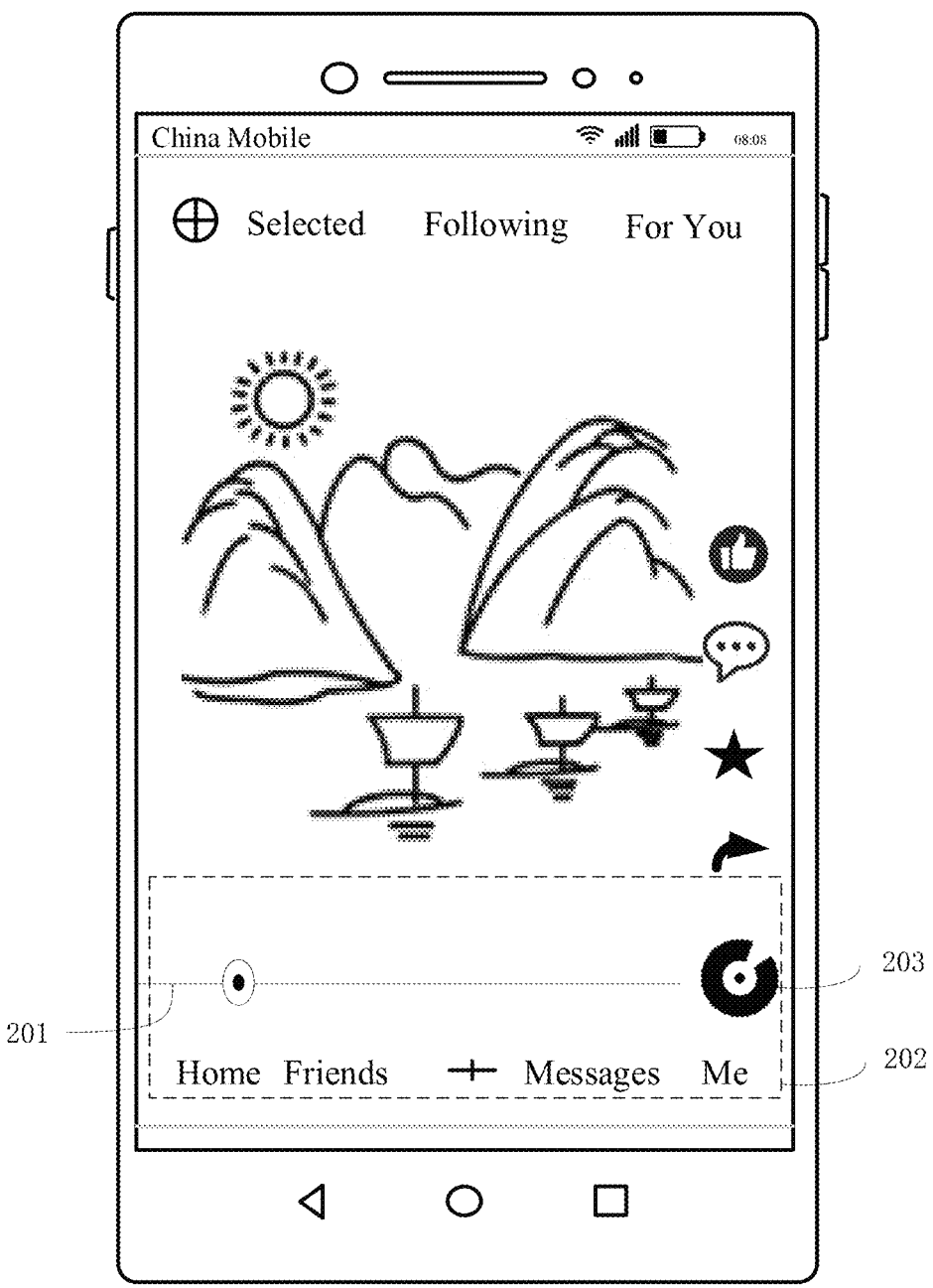
FIG. 2 is a schematic diagram of a video playback page according to an embodiment of the present disclosure.

FIG. 2 is a schematic diagram of a video playback page according to an embodiment of the present disclosure. A playback control progress bar 201 is displayed at a bottom position of the video playback page. The display position of the playback progress bar may be any position such as an upper position and a lower position of the video playback page. This is not limited in this embodiment of the present disclosure. A preset playback control region 202 is determined based on a display position of the playback control progress bar 201. Specifically, a region determined based on specific heights respectively above and below the position of the playback control progress bar may be set as the preset playback control region, for example, the preset playback control region 202 shown in FIG. 2.

In this embodiment of the present disclosure, the touch-and-hold operation on the preset playback control region on the video playback page of the first video is used to trigger the entry into the pure video playback mode. The pure video playback mode is used to hide the function control displayed on the video playback page.

Figure 3:
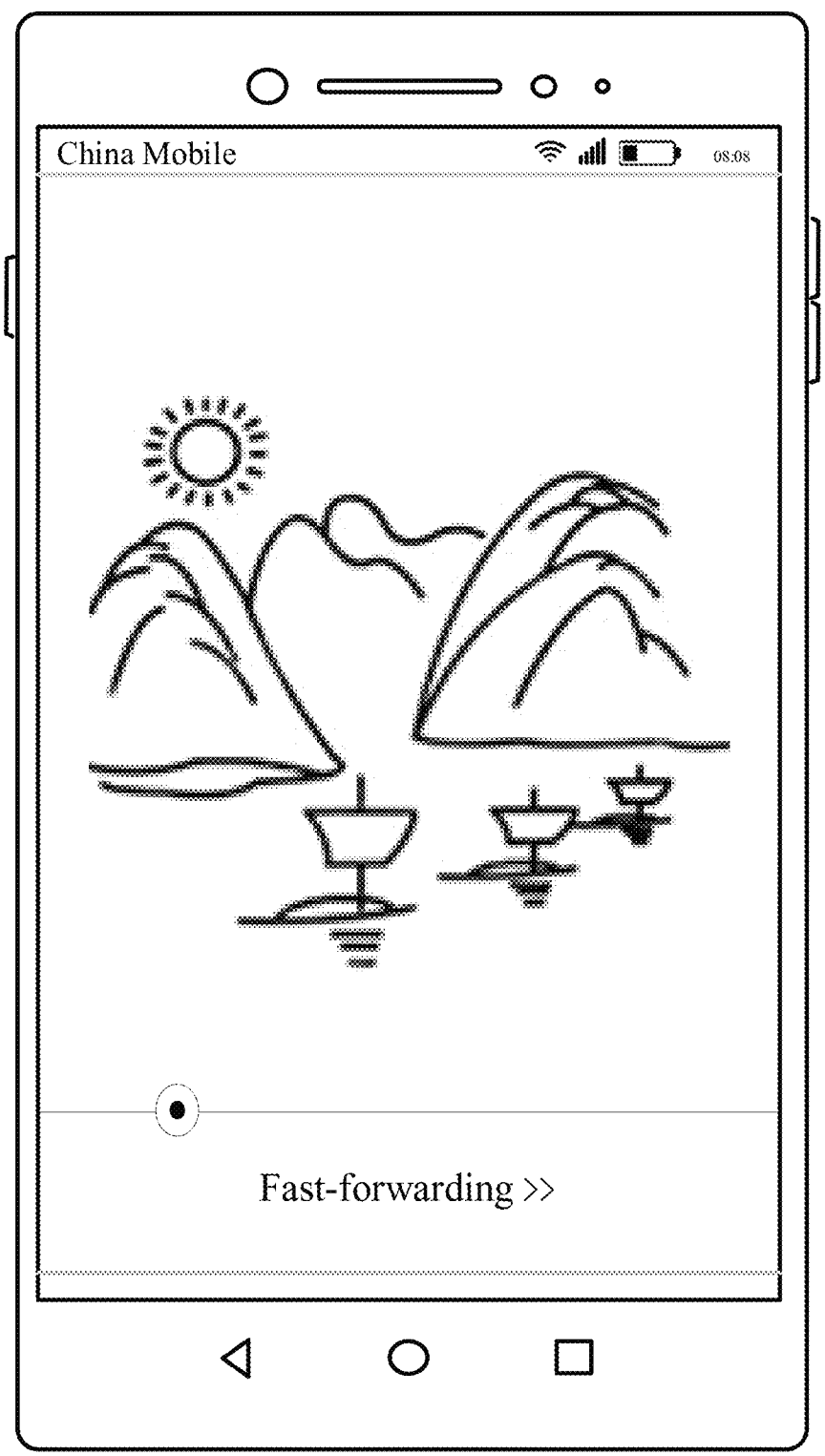
FIG. 3 is a schematic diagram of a page in a pure video playback mode according to an embodiment of the present disclosure.

As shown in FIG. 2, a user touches and holds the preset playback control region 202 on the video playback page, and the touch-and-hold operation on the preset playback control region 202 triggers the entry into the pure video playback mode. FIG. 3 is a schematic diagram of a page in a pure video playback mode according to an embodiment of the present disclosure. The function control displayed on the video playback page is hidden in the pure video playback mode. The function control on the video playback page is a control configured to trigger an interactive function on the video playback page, for example, a like control and a comment control shown in FIG. 2.

As shown in FIG. 3, function controls displayed at the bottom and right of the video playback page shown in FIG. 2 are all hidden in the pure video playback mode. This reduces interference of the displayed function controls to a video image when the user is fast-forwarding the video, thereby improving watching experience of the user when fast-forwarding the video.

In actual applications, a function control may be displayed in the preset playback control region on the video playback page. That is, the preset playback control region has an overlap with a display region of the function control. If a trigger operation on the function control includes a touch-and-hold operation, a response priority needs to be preset for a touch-and-hold operation acting on the overlapping region.

In this embodiment of the present disclosure, for the touch-and-hold operation, it is preset that a response priority for the function control is higher than that for the preset playback control region. That is, when the user touches and holds the display region of the function control displayed in the preset playback control region, a response is first made to a function corresponding to the function control.

In this embodiment of the present disclosure, if a first function control is displayed in the preset playback control region on the video playback page, in response to a touch-and-hold operation acting on the first function control in the preset playback control region, an entry into a related function page of the first function control is triggered as a response to the touch-and-hold operation on the first function control. The first function control is any function control in the preset playback control region. A trigger operation on the first function control includes the touch-and-hold operation on the first function control; that is, a function corresponding to the first function control may be triggered through the touch-and-hold operation on the first function control.

As shown in FIG. 2, a first function control 203 is a video music playback control configured to trigger a playback operation on music contained in the first video played on the video playback page. When a touch-and-hold operation on the first function control 203 is received, an entry into a music playback page corresponding to the first function control 203 may be triggered, to implement a playback function for the music contained in the first video.

Specifically, in this embodiment of the present disclosure, the pure video playback mode is entered in response to a touch-and-hold operation acting on a specific region in the preset playback control region on the video playback page. The specific region in the preset playback control region is a region other than a display region of the first function control in the preset playback control region. As shown in FIG. 2, the specific region in the preset playback control region is a region other than a display region of the first function control 203 in the preset playback control region 201. In addition, a plurality of function controls on which a trigger operation includes a touch-and-hold operation may be displayed in the preset playback control region, and correspondingly, the specific region in the preset playback control region is a region other than display regions of the function controls in the preset playback control region.

S102: Continue to play the first video at a preset fast-forward speed on the video playback page in the pure video playback mode.

In this embodiment of the present disclosure, the pure video playback mode is entered in response to the touch-and-hold operation acting in the preset playback control region on the video playback page of the first video, and the first video continues to be played at the preset fast-forward speed in the pure video playback mode. Continuing to play the first video means continuing to play the first video based on a playback progress of the first video on the video playback page shown in FIG. 2. The preset fast-forward speed may be a preset 1.5× speed, 2× speed, or the like. A value of the preset fast-forward speed is not limited in this embodiment of the present disclosure.

In an optional implementation, after the pure video playback mode is entered through the touch-and-hold operation acting in the preset playback control region on the video playback page of the first video, different fast-forward playback speeds may be determined in the pure video playback mode based on a touch-and-hold time corresponding to the touch-and-hold operation. For example, in the pure video playback mode, if the preset playback control region on the video playback page is touched and held for 1 to 2 seconds, the first video may continue to be played at the 1.5× speed during this period; or if the preset playback control region on the video playback page is touched and held for at least 2 seconds, the first video may continue to be played at the 2× speed during this period. It can be learned that the user may control a duration of the touch-and-hold operation to control the fast-forward playback speed.

In an optional implementation, fast-forward playback prompt information is displayed on the video playback page in the pure video playback mode. For example, text indicating that the current video is currently fast-forwarded may be displayed, for example, "fast-forwarding", or prompt text indicating a current playback speed may be displayed, for example, "1.5× fast-forwarding". It should be noted that in this embodiment of the present disclosure, all other controls may be invisible in the pure video playback mode; that is, only the fast-forward playback prompt information is displayed on the video playback page in the pure video playback mode.

In an optional implementation, the playback control progress bar may further be displayed on the video playback page in the pure video playback mode, to enable the user to know about the playback progress of the currently fast-forwarded video in a fast-forward playback process.

During fast-forward playback of the first video in the pure video playback mode, if the user wants to stop fast-forward playback of the video, a lift operation corresponding to the touch-and-hold operation may be triggered to exit the pure video playback mode to stop fast-forward playback of the video and continue to play the first video at a default speed on the video playback page.

In an optional implementation, the pure video playback mode is exited in response to the lift operation corresponding to the touch-and-hold operation; and the first video continues to be played at the default speed on the video playback page. Continuing to play the video at the default speed means continuing to play the first video at the preset default speed based on the playback progress in the pure video playback mode. The preset default speed may be a 1× speed; that is, continued playback of the first video is controlled to be at a regular playback speed. In this case, fast-forward playback of the first video has been stopped.

For example, it is assumed that the default speed of the first video on the video playback page is the 1× speed. The user first touches and holds the preset playback control region on the video playback page to enter the pure video playback mode. In this case, a video playback speed in the pure video playback mode is the 1.5× speed. Then, the user triggers the lift operation corresponding to the touch-and-hold operation to exit the pure video playback mode to continue to play the first video at the 1× speed on the video playback page.

In the video playback progress control method provided in this embodiment of the present disclosure, the entry into the pure video playback mode is triggered when the touch-and-hold operation acting in the preset playback control region on the video playback page of the first video is received. Then, the first video continues to be played at the preset fast-forward speed on the video playback page in the pure video playback mode. The preset playback control region is determined based on the display position of the playback control progress bar. The pure video playback mode is used to hide the function control displayed on the video playback page. It can be learned that according to this embodiment of the present disclosure, a video fast-forward playback function based on the pure video playback mode can be triggered through the touch-and-hold operation acting in the preset playback control region on the video playback page, so that interactive functions in a video playback process are enriched, and video watching experience of users is improved.

Figure 4:
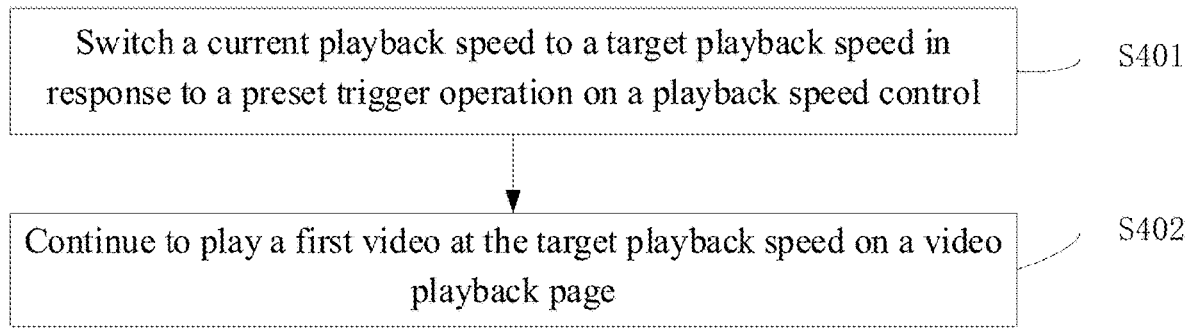
FIG. 4 is a flowchart of another video playback progress control method according to an embodiment of the present disclosure.

Based on the above embodiment, a playback speed control may further be set in the preset playback control region on the video playback page, to further enrich the interactive functions in the video playback process. Therefore, an embodiment of the present disclosure provides another video fast-forward playback processing method. FIG. 4 is a flowchart of another video fast-forward playback processing method according to an embodiment of the present disclosure. The method includes the following steps.

S401: Switch a current playback speed to a target playback speed in response to a preset trigger operation on the playback speed control.

At least one playback speed is preset in the playback speed control. The preset trigger operation on the playback speed control is used to implement a switching operation on the at least one playback speed. The preset trigger operation on the playback speed control may include a tap operation on the playback speed control, a tap operation on any playback speed displayed in the playback speed control in a drop-down box style, and the like.

A display style, a display position, and the like of the playback speed control are not limited in this embodiment of the present disclosure. For example, the display position of the playback speed control may be located at the left, right, or bottom region, or the like of the video playback page, and a display style of the playback speed control may be a circular style, a rectangular style, or the like.

In an optional implementation, the user may trigger switching of the playback speed of the first video through the tap operation on the playback speed control.

Figure 5:
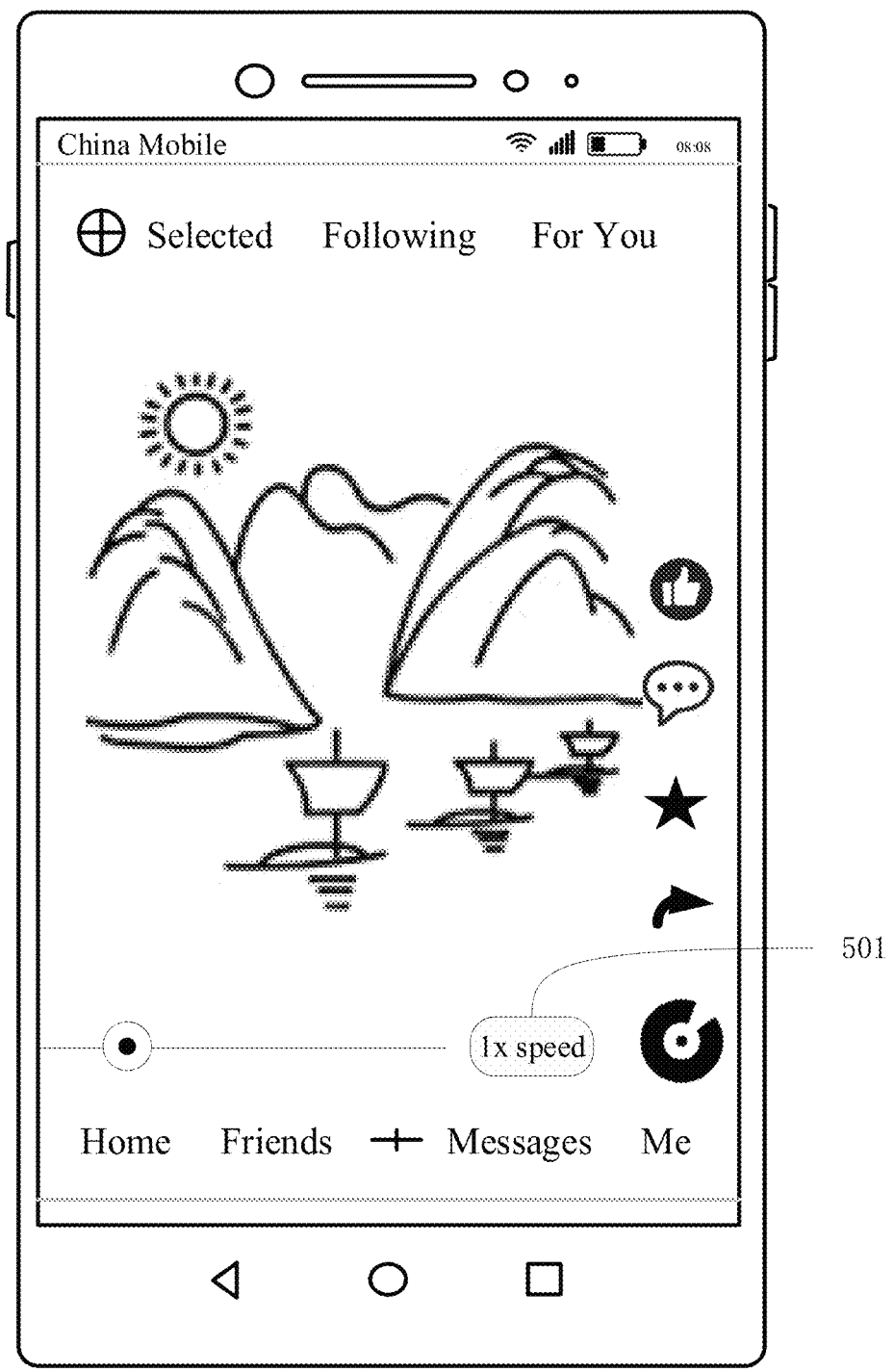
FIG. 5 is a schematic diagram of another video playback page according to an embodiment of the present disclosure.
Figure 6:
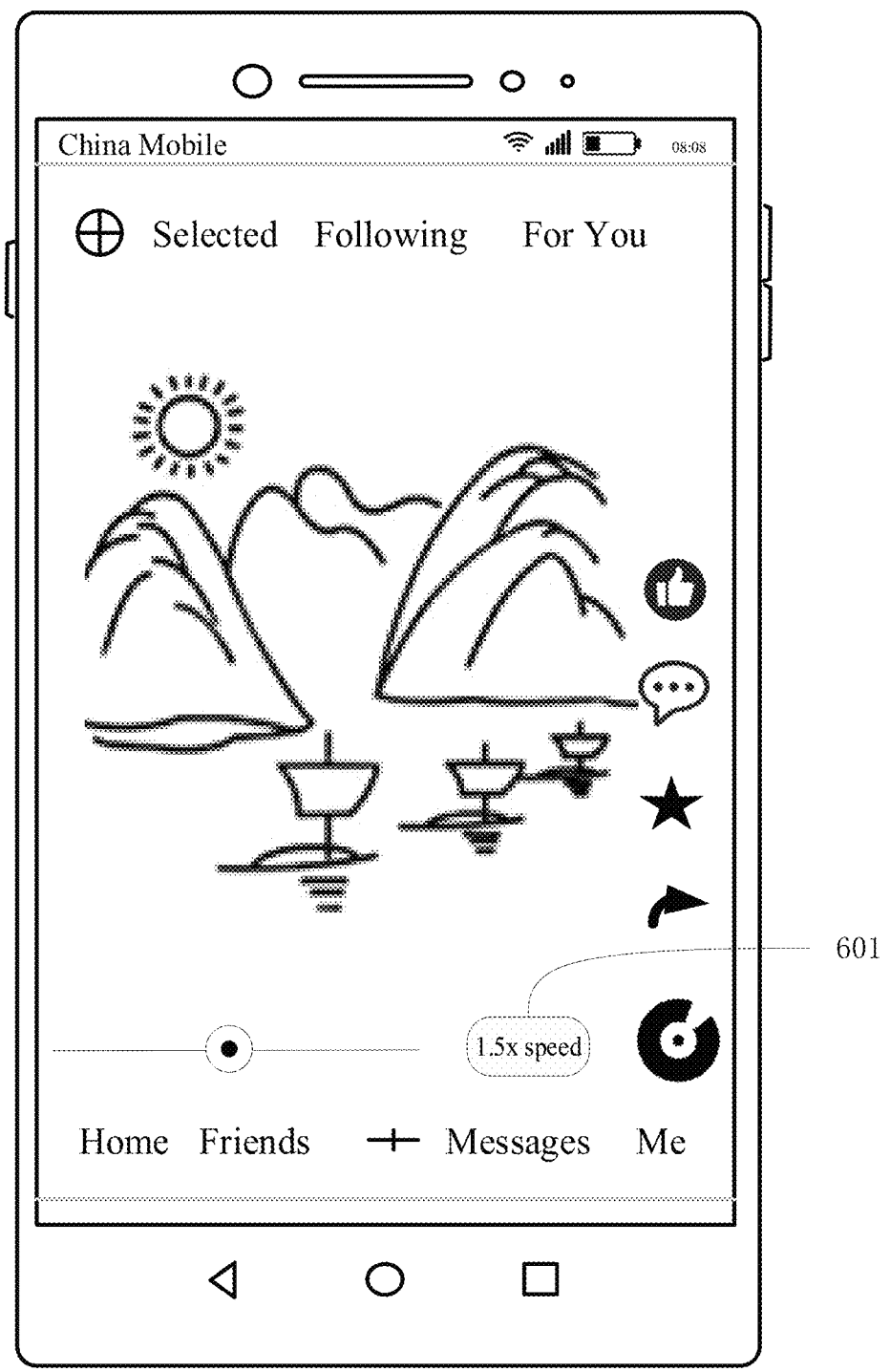
FIG. 6 is a schematic diagram of another video playback page according to an embodiment of the present disclosure.

FIG. 5 is a schematic diagram of a video playback page according to an embodiment of the present disclosure. A playback speed control 501 is displayed on the video playback page. If the current playback speed of the first video is the 1× speed, and the user taps the playback speed control, switching of the current playback speed of the first video from the 1× speed to the 1.5× speed shown in FIG. 6 may be triggered, and the 1.5× speed is used as the target playback speed. FIG. 6 is a schematic diagram of another video playback page according to an embodiment of the present disclosure. A playback speed displayed on a playback speed control 601 is the 1.5× speed. If the user taps the playback speed control again based on the 1.5× speed shown in FIG. 6, switching of the current playback speed of the first video from the 1.5× speed to the 2× speed may be triggered, and the 2× speed is used as the target playback speed.

In this embodiment of the present disclosure, the playback speed in the playback speed control may be cyclically switched. For example, when the current playback speed has reached the highest speed (assumed to be the 2× speed), if the user taps the playback speed control again, switching of the 2× speed to the 1× speed may be triggered, and the 1× speed is used as the target playback speed.

It should be noted that after the preset trigger operation on the playback speed control is received and the current playback speed is switched to the target playback speed, the playback speed displayed on the playback speed control is updated to the target playback speed in real time. The 1× speed displayed on the playback speed control 501 in FIG. 5 is updated to the 1.5× speed displayed on the playback speed control 601 in FIG. 6.

In another optional implementation, the playback speed control may be set to the drop-down box style, and the preset trigger operation on the playback speed control may be the tap operation on any playback speed displayed in the drop-down box. In other words, the user may select any playback speed from the drop-down box, and tap the playback speed to trigger fast-forward playback of the first video. Correspondingly, if the user wants to stop fast-forward playback, a 1× speed button set in the drop-down box may be tapped again to continue to play the first video at the 1× speed.

In another optional implementation, since the playback speed control is set in the preset playback control region, the entry into the pure video playback mode may be triggered in response to the touch-and-hold operation on the playback speed control, and the first video continues to be played at the preset fast-forward speed on the video playback page in the pure video playback mode.

As shown in FIG. 5, if the current playback speed displayed on the playback speed control is the 1× speed, and the preset fast-forward speed in the pure video playback mode is the 2× speed, the pure video playback mode shown in FIG. 3 is entered in response to a touch-and-hold operation on the playback speed control 501 on the video playback page, and the first video continues to be played at the 2× speed on the video playback page in the pure video playback mode.

Correspondingly, if the user wants to exit the pure video playback mode, the lift operation corresponding to the touch-and-hold operation may be triggered to exit the pure video playback mode to continue to play the first video at the 1× speed on the video playback page.

In this embodiment of the present disclosure, to enable the user to fast know about a related function of the playback speed control, prompt information such as "Touch and hold to fast-forward" or "Tap to fast-forward" may be displayed above the playback speed control, to prompt the user that fast-forward playback of the video may be triggered based on a requirement, so that user experience is improved. Specifically, a display occasion of the prompt information such as "Touch and hold to fast-forward" or "Tap to fast-forward" is not limited in this embodiment of the present disclosure. For example, the prompt information may be displayed when the user uses the function for the first time.

S402: Continue to play the first video at the target playback speed on the video playback page.

In this embodiment of the present disclosure, switching of the playback speed of the first video to the target playback speed may be controlled through the preset trigger operation on the playback speed control, and then the first video continues to be played at the target playback speed on the video playback page based on a current video playback progress.

In the video playback progress control method provided in this embodiment of the present disclosure, the entry into the pure video playback mode is triggered when the touch-and-hold operation acting in the preset playback control region on the video playback page of the first video is received. Then, the first video continues to be played at the preset fast-forward speed on the video playback page in the pure video playback mode. The preset playback control region is determined based on the display position of the playback control progress bar. The pure video playback mode is used to hide the function control displayed on the video playback page. It can be learned that according to this embodiment of the present disclosure, a video fast-forward playback function based on the pure video playback mode can be triggered through the touch-and-hold operation acting in the preset playback control region on the video playback page, so that interactive functions in a video playback process are enriched, and video watching experience of users is improved.

In addition, according to this embodiment of the present disclosure, the playback speed control can further be set on the video playback page, and a video playback speed switching function is triggered through the preset trigger operation on the playback speed control, so that the interactive functions in the video playback process are further enriched, and the video watching experience of the user is improved.

Figure 7:
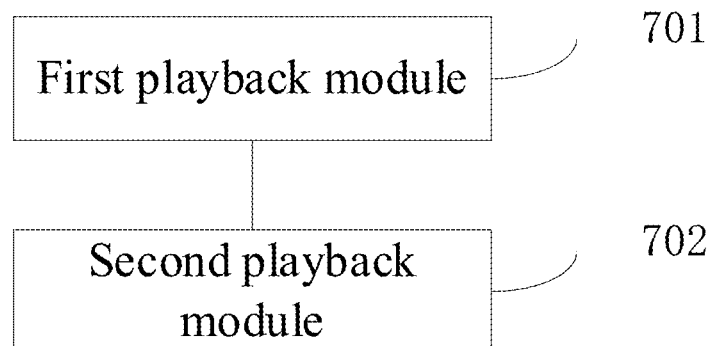
FIG. 7 is a schematic diagram of a structure of a video playback progress control apparatus according to an embodiment of the present disclosure.

Based on the above method embodiment, the present disclosure further provides a video playback progress control apparatus. FIG. 7 is a schematic diagram of a structure of a video playback progress control apparatus according to an embodiment of the present disclosure. The apparatus includes:

a first playback module 701 configured to enter a pure video playback mode in response to a touch-and-hold operation acting in a preset playback control region on a video playback page of a first video, where the preset playback control region is determined based on a display position of a playback control progress bar, and the pure video playback mode is used to hide a function control displayed on the video playback page; and a second playback module 702 configured to continue to play the first video at a preset fast-forward speed on the video playback page in the pure video playback mode.

In an optional implementation, the apparatus further includes:

an exit module configured to exit the pure video playback mode in response to a lift operation corresponding to the touch-and-hold operation; and a third playback module configured to continue to play the first video at a preset default speed on the video playback page.

In an optional implementation, the first playback module includes:

a switching submodule configured to switch a current playback speed to a target playback speed in response to a preset trigger operation on the playback speed control; and a first playback submodule configured to continue to play the first video at the target playback speed on the video playback page.

In an optional implementation, the first playback module includes:

a trigger submodule configured to trigger a function corresponding to a first function control in response to a touch-and-hold operation acting on the first function control in the preset playback control region; and a second playback submodule configured to enter the pure video playback mode in response to a touch-and-hold operation performed on a specific region in the preset playback control region on the video playback page of the first video, where the specific region includes a region other than a display region of the first function control in the preset playback control region.

In an optional implementation, the apparatus further includes:

a display module configured to display fast-forward playback prompt information on the video playback page based on the pure video playback mode.

In an optional implementation, the preset playback control region is located at a bottom position of the video playback page.

In the video playback progress control apparatus provided in this embodiment of the present disclosure, the entry into the pure video playback mode is triggered when the touch-and-hold operation acting in the preset playback control region on the video playback page of the first video is received. Then, the first video continues to be played at the preset fast-forward speed on the video playback page in the pure video playback mode. The preset playback control region is determined based on the display position of the playback control progress bar. The pure video playback mode is used to hide the function control displayed on the video playback page. It can be learned that according to this embodiment of the present disclosure, a video fast-forward playback function based on the pure video playback mode can be triggered through the touch-and-hold operation acting in the preset playback control region on the video playback page, so that interactive functions in a video playback process are enriched, and video watching experience of users is improved.

In addition to the method and apparatus described above, an embodiment of the present disclosure further provides a computer-readable storage medium having instructions stored therein. The instructions, when run on a terminal device, cause the terminal device to implement the video playback progress control method described in the embodiments of the present disclosure.

An embodiment of the present disclosure further provides a computer program product. The computer program product includes a computer program or instructions. The computer program or instructions, when executed by a processor, cause the video playback progress control method described in the embodiments of the present disclosure to be implemented.

Figure 8:
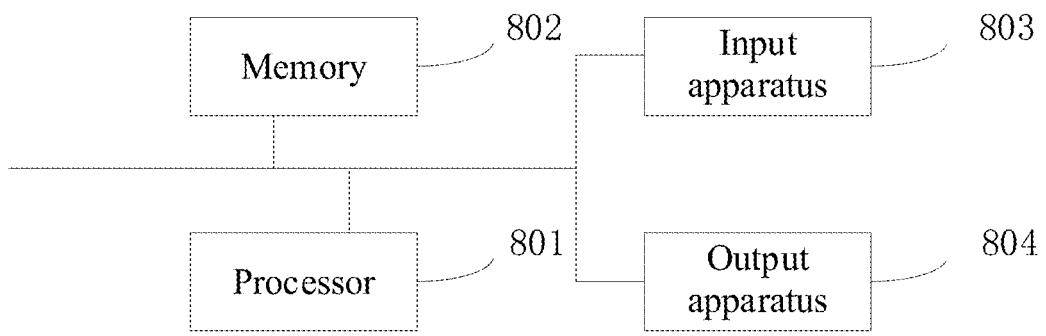
FIG. 8 is a schematic diagram of a structure of a video playback progress control device according to an embodiment of the present disclosure.

In addition, an embodiment of the present disclosure further provides a video playback progress control device. As shown in FIG. 8, the device may include:

a processor 801, a memory 802, an input apparatus 803, and an output apparatus 804. There may be one or more processors 801 in the video playback progress control device. For example, there is one processor in FIG. 8. In some embodiments of the present disclosure, the processor 801, the memory 802, the input apparatus 803, and the output apparatus 804 may be connected through a bus or in another manner. For example, they are connected through the bus in FIG. 8.

The memory 802 may be configured to store a software program and a module. The processor 801 performs various functional applications of the video playback progress control device and processes data by running the software program and the module stored in the memory 802. The memory 802 may mainly include a program storage area and a data storage area. The program storage area may store an operating system, an application required by at least one function, and the like. In addition, the memory 802 may include a high-speed random access memory, and may further include a non-volatile memory, such as at least one magnetic disk storage device, a flash memory device, or other volatile solid-state storage devices. The input apparatus 803 may be configured to receive entered digit or character information, and generate signal input related to user settings and function control of the video playback progress control device.

Specifically, in this embodiment, the processor 801 loads an executable file corresponding to a process of one or more applications into the memory 802 in accordance with the following instructions, and the processor 801 runs the application stored in the memory 802, so as to implement various functions of the video playback progress control device.

It should be noted that the relational terms such as "first" and "second" herein are only used to distinguish one entity or operation from another, and do not necessarily require or imply that any actual relationship or sequence exists between these entities or operations. Moreover, the terms "include" and "comprise", or any of their variants are intended to cover a non-exclusive inclusion, so that a process, method, article, or device that includes a list of elements not only includes those elements but also includes other elements that are not expressly listed, or further includes elements inherent to such process, method, article, or device. In the absence of more restrictions, an element defined by "including a . . . " does not exclude another identical element in a process, method, article, or device that includes the element.

The above description illustrates merely specific implementations of the present disclosure, so that a person skilled in the art can understand or implement the present disclosure. Various modifications to these embodiments are apparent to a person skilled in the art, and the general principle defined herein may be practiced in other embodiments without departing from the spirit or scope of the present disclosure. Therefore, the present disclosure is not limited to the embodiments described herein but is to be accorded the broadest scope consistent with the principle and novel features disclosed herein.

The invention claimed is:

1. A video playback progress control method, comprising:
    entering a pure video playback mode in response to a touch-and-hold operation acting in a preset playback control region on a video playback page of a first video, wherein the touch-and-hold operation is an operation for touching a position and holding at the position without movement, the preset playback control region is determined based on a display position of a playback control progress bar, the preset playback control region comprises at least one of followings: a region determined based on a preset height above the position of the playback control progress bar or a region determined based on the preset height below the position of the playback control progress bar, and the pure video playback mode is used to hide a function control displayed on the video playback page; and
    continuing to play the first video at a preset fast-forward speed on the video playback page in the pure video playback mode,
    wherein the preset fast-forward playback speed is determined in the pure video playback mode based on a touch-and-hold time corresponding to the touch-and-hold operation.

2. The method according to claim 1, further comprising:
    exiting the pure video playback mode in response to a lift operation corresponding to the touch-and-hold operation; and
    continuing to play the first video at a preset default speed on the video playback page.

3. The method according to claim 1, wherein a playback speed control is displayed in the preset playback control region; and the method further comprises:
    switching a current playback speed to a target playback speed in response to a preset trigger operation on the playback speed control; and
    continuing to play the first video at the target playback speed on the video playback page.

4. The method according to claim 1, wherein a first function control is displayed in the preset playback control region, a function trigger operation on the first function control comprises a touch-and-hold operation, and the method further comprises:
    triggering a function corresponding to the first function control in response to the touch-and-hold operation acting on the first function control in the preset playback control region; and
    correspondingly, the entering the pure video playback mode in response to the touch-and-hold operation acting in the preset playback control region on the video playback page of the first video comprises:
    entering the pure video playback mode in response to the touch-and-hold operation acting on a specific region in the preset playback control region on the video playback page of the first video, wherein the specific region comprises a region other than a display region of the first function control in the preset playback control region.

5. The method according to claim 1, further comprising:
    displaying fast-forward playback prompt information on the video playback page based on the pure video playback mode.

6. The method according to claim 1, wherein the preset playback control region is located at a bottom position of the video playback page.

7. A non-transitory computer-readable storage medium having instructions stored therein, wherein the instructions, when run on a terminal device, cause the terminal device to implement a video playback progress control method, and the method comprises:
    entering a pure video playback mode in response to a touch-and-hold operation acting in a preset playback control region on a video playback page of a first video, wherein the touch-and-hold operation is an operation for touching a position and holding at the position without movement, the preset playback control region is determined based on a display position of a playback control progress bar, the preset playback control region comprises at least one of followings: a region determined based on a preset height above the position of the playback control progress bar or a region determined based on the preset height below the position of the playback control progress bar, and the pure video playback mode is used to hide a function control displayed on the video playback page; and continuing to play the first video at a preset fast-forward speed on the video playback page in the pure video playback mode, wherein the preset fast-forward playback speed is determined in the pure video playback mode based on a touch-and-hold time corresponding to the touch-and-hold operation.

8. A video playback progress control device, comprising: a memory, a processor, and a computer program stored on the memory and runnable on the processor, wherein the computer program, when executed by the processor, causes a video playback progress control method to be implemented, and the method comprises:

entering a pure video playback mode in response to a touch-and-hold operation acting in a preset playback control region on a video playback page of a first video, wherein the touch-and-hold operation is an operation for touching a position and holding at the position without movement, the preset playback control region is determined based on a display position of a playback control progress bar, the preset playback control region comprises at least one of followings: a region determined based on a preset height above the position of the playback control progress bar or a region determined based on the preset height below the position of the playback control progress bar, and the pure video playback mode is used to hide a function control displayed on the video playback page; and continuing to play the first video at a preset fast-forward speed on the video playback page in the pure video playback mode, wherein the preset fast-forward playback speed is determined in the pure video playback mode based on a touch-and-hold time corresponding to the touch-and-hold operation.

9. The device according to claim 8, further comprising:
exiting the pure video playback mode in response to a lift operation corresponding to the touch-and-hold operation; and
continuing to play the first video at a preset default speed on the video playback page.

10. The device according to claim 8, wherein a playback speed control is displayed in the preset playback control region; and the method further comprises:
switching a current playback speed to a target playback speed in response to a preset trigger operation on the playback speed control; and
continuing to play the first video at the target playback speed on the video playback page.

11. The device according to claim 8, wherein a first function control is displayed in the preset playback control region, a function trigger operation on the first function control comprises a touch-and-hold operation, and the method further comprises:
triggering a function corresponding to the first function control in response to the touch-and-hold operation acting on the first function control in the preset playback control region; and
correspondingly, the entering the pure video playback mode in response to the touch-and-hold operation acting in the preset playback control region on the video playback page of the first video comprises:
entering the pure video playback mode in response to the touch-and-hold operation acting on a specific region in the preset playback control region on the video playback page of the first video, wherein the specific region comprises a region other than a display region of the first function control in the preset playback control region.

12. The device according to claim 8, further comprising:
displaying fast-forward playback prompt information on the video playback page based on the pure video playback mode.

13. The device according to claim 8, wherein the preset playback control region is located at a bottom position of the video playback page.

* * * * *